United States Patent [19]

Wiercinski et al.

[11] Patent Number: 5,270,373
[45] Date of Patent: Dec. 14, 1993

[54] AQUEOUS-BASED WATERPROOFING PRIMER SYSTEM AND METHOD

[75] Inventors: Robert A. Wiercinski, Lincoln; Robert F. Jenkins, Wakefield, both of Mass.; James M. Gaidis, Ellicott City; Susan G. Ehrlich, Woodbine, both of Md.

[73] Assignee: W. R. Grace & Co.-Conn., New York, N.Y.

[21] Appl. No.: 893,487

[22] Filed: Jun. 5, 1992

[51] Int. Cl.$^5$ .................. C08K 3/30; B65B 55/00
[52] U.S. Cl. ..................... 524/423; 524/429; 427/393.6; 427/407.1
[58] Field of Search .............. 427/393.6, 380, 407.1, 427/419.1, 418; 524/423, 429

[56] References Cited

U.S. PATENT DOCUMENTS

| | | | |
|---|---|---|---|
| 2,447,772 | 8/1948 | Rust et al. | 260/29.7 |
| 2,447,877 | 8/1948 | Rust | 260/29.7 |
| 3,014,040 | 12/1961 | Howland et al. | 260/29.7 |
| 3,049,500 | 8/1962 | Howland et al. | 260/17.4 |
| 3,049,502 | 8/1962 | Howland et al. | 260/17.4 |
| 3,080,334 | 3/1963 | Kolaczewski et al. | 260/29.7 |
| 3,228,906 | 1/1966 | Schluter et al. | 260/29.7 |
| 3,551,370 | 12/1970 | Dalton | 260/23.7 |
| 4,043,955 | 8/1977 | Paster | 260/23.7 A |
| 4,559,241 | 12/1985 | Obitsu | 427/393.6 |
| 4,600,635 | 7/1986 | Wiercinski et al. | 428/220 |
| 4,792,357 | 12/1988 | Bier | 106/83 |
| 4,897,313 | 1/1990 | Wiecinski | 428/489 |
| 4,897,462 | 1/1990 | Yusa et al. | 528/486 |

FOREIGN PATENT DOCUMENTS

| | | | |
|---|---|---|---|
| 666498 | 7/1960 | Canada . | |
| 0098561 | 7/1980 | Japan | 427/393.6 |
| 01300381 | 7/1984 | Japan | 427/393.6 |
| 60-67681 | 4/1985 | Japan . | |
| 61-223061 | 10/1986 | Japan . | |

*Primary Examiner*—Paul R. Michl
*Assistant Examiner*—LaVonda DeWitt
*Attorney, Agent, or Firm*—Craig K. Leon; William L. Baker

[57] ABSTRACT

The present invention provides a waterproofing system and method in which salt is used to prevent re-emulsification of an aqueous-based emulsion polymer primer composition which has been applied to a water penetrable building surface, whereby the bond between the building structure and a subsequently applied waterproofing membrane remains strong and durable.

19 Claims, 1 Drawing Sheet

AQUEOUS-BASED WATERPROOFING PRIMER SYSTEM AND METHOD

FIELD OF THE INVENTION

The present invention relates to waterproofing primers, and more particularly to a novel aqueous-based waterproofing primer system and method.

BACKGROUND OF THE INVENTION

Primers are used in waterproofing applications for providing long-term bond strength between water-penetrable building structures such as sub-surface basement and foundation walls, and waterproofing membranes which are applied to the structures after the primer has been applied. Waterproofing membranes in current use are preformed, and comprise a layer of adhesive and a support sheet. Adhesion is diminished by the presence of dust particles which cover the cement and concrete walls. Priming or pretreatment is required especially in these instances because the ability to form a bond is decreased by the particles.

Organic solvent-based primers usually exhibit superior water immersion resistance in comparison to primers that are based on aqueous emulsions. Aqueous-based emulsions are more desirable from an environment standpoint, but must be carefully chosen to prevent re-emulsification by moisture which may reside in the building structure or which may be introduced through holes or punctures in the waterproofing membrane.

One of the purposes of the present invention is thus to minimize re-emulsification of the film-formed layer which results from using an aqueous-based primer.

SUMMARY OF THE INVENTION

The present invention provides a system and method of waterproofing which provides long-term durability of the bond between a building structure and a waterproofing membrane. The inventors have discovered that the film formed upon evaporation of the water from the primer composition, which is applied as a polymer aqueous emulsion to a building surface prior to the application of the waterproofing membrane, is protected from re-emulsification by separately applying a salt. The tendency of the film layer formed from the primer composition to re-emulsify is minimized because the salt is believed to render insoluble the surfactant system used in the emulsion and thereby to increase water immersion resistance.

Exemplary systems and methods of the invention therefore include the use of salt which is applied separately from the primer to the building surface. The salt may be applied directly to the building structure, such as by applying a salt solution on the wall prior to, or after, the application of the primer composition. The salt may also be applied simultaneously with the priming composition by using two applicators, such as twin spray nozzles. Alternatively, or in addition to any of these methods, the salt may be applied by applying it on or incorporating it into the adhesive layer of a preformed waterproofing membrane. Thus, in one exemplary embodiment of the invention, the primer composition is applied to a building surface, allowed to dry, and then the membrane having a salt-containing adhesive layer is applied to the primed surface. The salt is applied separately from the primer composition and in an amount sufficient, if the salt and emulsion were directly mixed together, to coagulate the emulsion of the primer such that the polymer is not re-emulsifiable.

Further exemplary systems and methods of the invention are described hereinafter.

DRAWING OF EXEMPLARY EMBODIMENTS

FIG. 1 is an illustration of exemplary systems and methods of the invention whereby a salt and aqueous-based emulsion primer composition are separately applied to a building structure in conjunction with an exemplary waterproofing membrane.

DETAILED DESCRIPTION OF THE INVENTION

Figure 1:
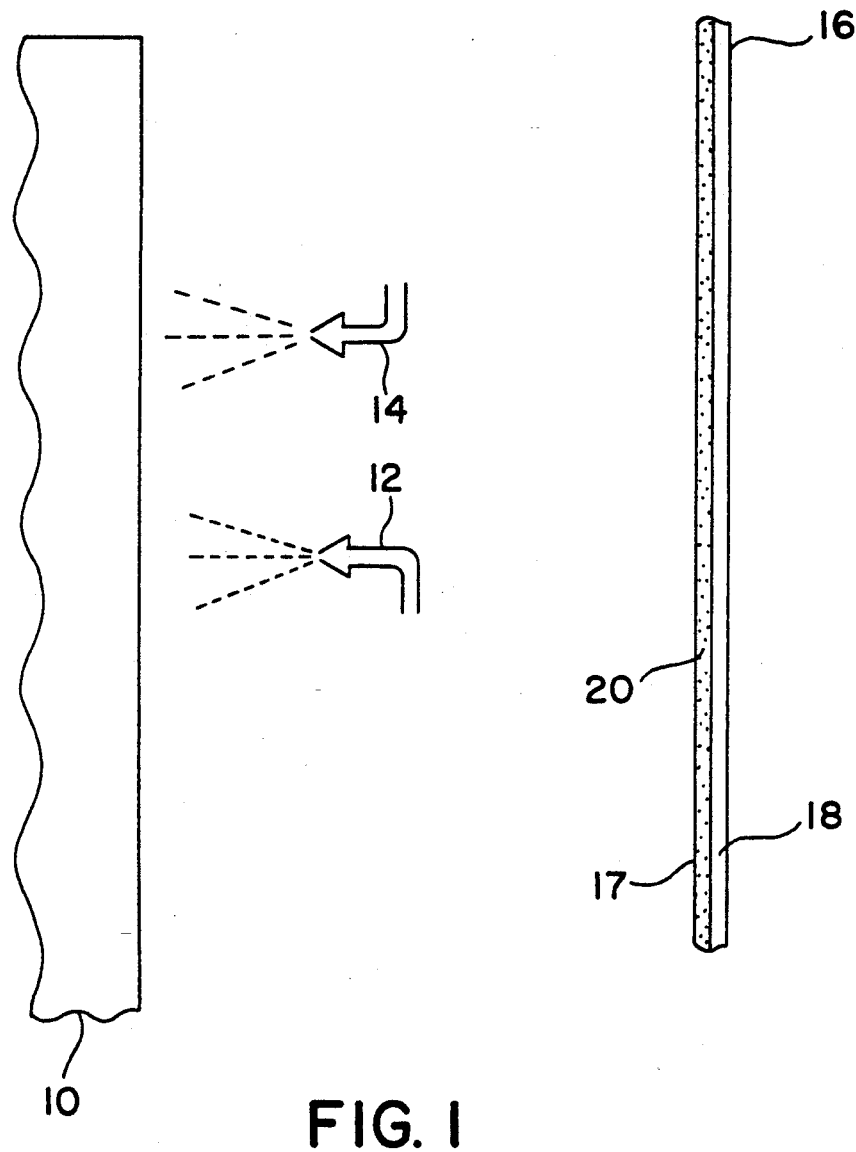

FIG. 1 is an illustration of exemplary systems and methods of the invention whereby salt is applied to a building structure 10 such as a subsurface basement, foundation, concrete wall, retaining wall, bridge abutment, tunnel, pipe, lagging member or similar water-penetrable structure. Salt may be applied to the structure 10 in the form of a solution by using a spray nozzle, as designated at 12, by brushing, or other known means. Salt 12 may be applied prior to or after application of the priming composition 14 onto the structure 10, or simultaneously therewith, such as by using two sprayers 12,14. The salt may also be applied by brushing or spraying a salt solution onto the adhesive layer 17 of the waterproofing membrane 16 or by mixing, dispersing, or loading the salt 20 into the adhesive layer 17 of the membrane 16, which is comprised of the adhesive 17 and support 18 layers. Thus, for example, the primer 14 is applied and allowed to dry, then the membrane 16 having a salt-containing 20 adhesive layer 17 is applied to the pretreated surface 10.

The salt 12 may be alternatively incorporated into the emulsion of the primer composition and/or on or into the membrane adhesive layer, such as by encapsulating the salt to isolate it from the emulsion of the primer composition. Microencapsulation may be achieved by surrounding the salt or salt solution with a coating to produce small capsules or microspheres which can be broken upon application. Exemplary coatings may include natural polymers such as waxes, proteins, natural rubber; synthetic polymers such as polystyrene, polyethylene, polypropylene, polyurethane; and synthetic elastomers such as chloroprene, styrene butadiene rubber, and silicone rubber. Release of the salt may be activated by physical crushing or dissolution of the microspheres or capsules. Dissolution of the coating or wall may also be triggered by changing the pH or through enzymatic action.

Known waterproofing membranes 16 can be used in the present invention. Preferably, the membrane is preformed and comprises a carrier sheet 18 and pressure-sensitive adhesive 17. The adhesive is preferably a modified bitumen or butyl-based rubber adhesive.

Known aqueous-based emulsion primer compositions 14 and ionic surfactant systems may be used. For example, the composition may comprise styrene butadiene rubber, styrene butadiene styrene, natural rubber, polybutadiene, polyvinyl acetate, acrylic polymer, chloroprene, polyurethane, copolymers of ethylene and vinyl acetate, or copolymers of vinyl chloride and acrylics, or a combination thereof. The preferred primer (or pretreatment) composition 14 is one comprising a styrene butadiene rubber emulsion which is stabilized by a surfactant and preferably by a fatty acid or mixed acid salt surfactant system. The preferred surfactant system comprises potassium oleate.

Exemplary salts which improve water immersion resistance, and are contemplated for use in the systems and methods of the invention, include calcium chloride, calcium nitrite, iron nitrate, zinc sulfate, aluminum sulfate, and iron sulfate. Salts with good water solubility are preferred. In general, for anionic surfactants, a salt containing a precipitating cation is required. For cationic surfactants, a salt containing a precipitating anion is required. Preferably, the precipitating cations and anions are multivalent. Thus, in an exemplary embodiment of the invention, a potassium oleate/SBR-based primer composition is treated with calcium nitrite solution, and the calcium exchanges with the potassium to form insoluble calcium oleate.

The amount of the salt should be sufficient to coagulate the emulsion permanently so that the polymer is not re-emulsifiable. In other words, if the salt and emulsion were alone mixed together, the minimum amount of salt required would be that which would cause noticeable coagulation.

In the field of latexes and paints, salts are sometimes added to increase particle size and/or solids levels, See e.g. U.S. Pat. Nos. 3,014,040; 3,049,500; 3,049,502; 3,551,370; 4,043,955; See also Can. Pat. 666,498. However, care is taken to ensure that particle size does not increase to the point of coagulation. Id. See also U.S. Pat. Nos. 2,447,772; 2,447,877; 4,792,357; and JP 0067-681-A. Compare U.S. Pat. No. 4,897,462 (large dispersed rubber particles are coagulated with a high salt concentration). Until the present invention, however, there has been no motivation either to combine salt with emulsion waterproofing primer compositions, or to do so by separate application of each to water-penetrable building surfaces sought to be treated. Nor has there been any motivation to use salts in amounts that would permanently coagulate the emulsion.

EXAMPLE I

The test which most broadly defines the underlying coagulation reaction of the invention is one in which the aqueous-based emulsion is mixed with a salt in an amount sufficient to cause noticeable coagulation. The coagulated emulsion can be separated from the aqueous phase using a large pore filtration device such as a common window screen. The coagulation of the emulsion described herein, rendered into a non-redispersible form, contrasts the dispersible forms of emulsions (i.e. those which are merely thickened or "creamed").

EXAMPLE II

A peel adhesion test may used to characterize organic polymer aqueous emulsion/salt pairs that work well in contrast to those that do not work well. Test samples may be made in one of several ways. In the case discussed below, the substrate is a concrete patio block. Accordingly, an exemplary method for applying the waterproofing primer system of the invention includes coating the block with a salt solution that contains 30 percent by weight of the salt at approximately 500 square feet per gallon, and allowing it to dry before application of the primer. The primer composition is formulated with an SBR emulsion stabilized with potassium oleate. The formulation comprises the following components on a percentage weight basis: SBR comprised of 69% solids (28), water (58.8), propylene glycol (11.5), styrene-maleic anhydride resin (1.0), and ammonium hydroxide (0.7). The primer composition is coated onto the block at approximately 500 square feet per gallon (approximately 33 g/sq. ft.) and allowed to dry for 24 hours. A preformed waterproofing tape having a support sheet and a layer of modified bitumen pressure-sensitive adhesive (such as Bituthene ® 4000 from W.R. Grace & Co., Conn.), approximately 3 by 6 inches, is applied to the block. A 30 lb. roller is passed 4 times over the adhered sample, which is allowed to stand at room temperature for 24 hours. The entire construction (block/salt treatment/primer composition/pressure sensitive tape) is then immersed in water for 14 days. Subsequently, peel adhesion is measured using an Instron ™ mechanical tester at a crosshead speed of approximately 2 inches per minute.

Samples prepared with the salt treatment exhibited better retention of bond strength after 14 days when compared to a control sample which was not treated with salt:

TABLE 1

| Salt | Peel Adhesion (lbs/inch) |
| --- | --- |
| None | 1.16 |
| Fe(NO$_3$)$_2$ | 5.4 |
| MgSO$_4$ | 2.25 |
| ZnSO$_4$ | 1.6 |
| Al$_2$(SO$_4$)$_3$ | 1.5 |
| Ca(CH$_3$CO$_2$)$_2$ | 2.1 |
| Fe$_2$(SO$_4$)$_3$ | 2.05 |
| Ca(NO$_2$)$_2$ | 4.31 |

EXAMPLE III

A second method for determining peel adhesion strength comprises the step of applying a primer composition to a concrete patio block at approximately 500 square feet per gallon, allowing the primer to dry, and then applying a waterproofing membrane comprising a modified bitumen pressure sensitive adhesive which has approximately 10 percent by weight of salt in the adhesive. The salt is blended into the adhesive at 300 degrees Fahrenheit with moderate agitation for fifteen minutes. A concrete block is coated with a primer based on an SBR emulsion stabilized with potassium oleate (20% solids level) at a coverage rate of 500 sq.ft./gal., and allowed to dry. The salt-modified pressure sensitive tape (3 by 6 inches) is applied to the primed block, rolled 4 times with a 30 lb. roller, allowed to stand for 1 day, immersed in water for 14 days, and then tested for adhesion.

Samples prepared with the salt treatment exhibited better retention of bond strength after 14 days when compared to a control sample which was not treated with the salt:

| Salt | Peel Adhesion (lbs/inch) |
| --- | --- |
| None | 1.1 |
| Ca(NO$_2$)$_2$ | 4.25 |
| CaCl$_2$ | 2.4 |

As modifications of the invention may be evident to those skilled in the art, the scope of the invention is intended to be limited only by the following claims.

We claim:

1. A method for waterproofing comprising the steps of:

applying an aqueous-based emulsion primer composition to a building surface;

separately applying a water-soluble salt to said building surface, said water-soluble salt being separately applied such that it is operative to coagulate said aqueous-based emulsion primer composition which has been separately applied, said salt being water-soluble thereby to prevent re-emulsification of said primer composition; and applying a preformed waterproofing membrane to said building surface after said aqueous-based emulsion primer has been applied thereupon.

2. The method of claim 1 wherein said preformed waterproofing membrane comprises a carrier sheet and a pressure-sensitive adhesive.

3. The method of claim 1 wherein said step of separately applying said water-soluble salt occurs prior to, after, or simultaneously with said step of applying said primer composition.

4. A method for waterproofing comprising the steps of:

applying an aqueous-based emulsion primer composition to a building surface; and applying to said primed surface a waterproofing membrane comprising an adhesive, said adhesive having a water-soluble salt.

5. The method of claim 2 wherein said pressure-sensitive adhesive comprises a modified bitumen or butyl-based adhesive.

6. The method of claim 5 wherein said water-soluble salt is applied to said building surface prior to said application of said preformed waterproofing membrane, and said performed waterproofing membrane further comprises a water-soluble salt.

7. The method of claim 1 wherein, in said step of applying said emulsion primer composition, said composition is selected from the group consisting of styrene butadiene rubber, styrene butadiene styrene, natural rubber, polybutadiene, polyvinyl acetate, acrylic polymer, chloroprene rubber, polyurethane, copolymers of ethylene and vinyl acetate, and copolymers of vinyl chloride and acrylic.

8. The method of claim 1 wherein, in said step of providing an aqueous-based primer composition, said composition comprises a styrene butadiene rubber emulsion and a surfactant.

9. The method of claim 8 wherein said surfactant comprises potassium oleate.

10. The method of claim 1 wherein said separate application of said primer composition and said water-soluble salt are performed simultaneously by separate nozzles.

11. The method of claim 1 wherein, in said step of applying said water-soluble salt, said water-soluble salt is selected from the group consisting of calcium chloride, calcium nitrite, iron nitrate, zinc sulfate, aluminum sulfate, and iron sulfate.

12. The method of claim 1 wherein said primer composition comprises styrene butadiene rubber emulsion and potassium oleate, said water-soluble salt comprises calcium nitrite, and said preformed waterproofing membrane comprises a carrier sheet and a modified bitumen pressure-sensitive adhesive.

13. The method of claim 1 wherein said water-soluble salt comprises a multivalent salt.

14. The method of claim 1 wherein said water-soluble salt is applied in an amount sufficient, if said water-soluble salt and emulsion were directly mixed together, to coagulate the emulsion of the primer composition such that said primer composition is not re-emulsifiable.

15. The method of claim 1 wherein said water-soluble salt contains a precipitating cation where said primer composition contains an anionic surfactant or said water-soluble salt contains a precipitating anion where said primer composition contains a cationic surfactant.

16. The method of claim 1 wherein said water-soluble salt is encapsulated.

17. A method of waterproofing comprising the steps of:

applying a primer composition comprising a polymer aqueous emulsion and an encapsulated water-soluble salt or salt solution to a building surface;

releasing said water-soluble salt or salt solution from said encapsulation, whereby said water-soluble salt or salt solution is operative to minimize re-emulsification of said primer composition; and applying a waterproofing membrane to said building surface.

18. The method of claim 17 wherein said encapsulation is achieved by coating said water-soluble salt or encapsulating said salt solution in a material selected from the group consisting of wax, protein, rubber, polymer, and elastomer.

19. The method of claim 18 wherein said releasing of said water-soluble salt or salt solution from said encapsulation is achieved by physical crushing or dissolution thereof.

* * * * *